United States Patent
Winker

(10) Patent No.: US 7,329,078 B2
(45) Date of Patent: *Feb. 12, 2008

(54) NUT AND METHOD FOR THE PRODUCTION THEREOF

(75) Inventor: Alexander Winker, Spaichingen (DE)

(73) Assignee: Metallwarenfabrik Hermann Winker GmbH & Co. KG, Spaichingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/486,626

(22) PCT Filed: May 6, 2003

(86) PCT No.: PCT/EP03/04724

§ 371 (c)(1),
(2), (4) Date: Aug. 16, 2004

(87) PCT Pub. No.: WO03/093683

PCT Pub. Date: Nov. 13, 2003

(65) Prior Publication Data

US 2005/0008457 A1 Jan. 13, 2005

(30) Foreign Application Priority Data

May 6, 2002 (DE) ................................. 102 20 233

(51) Int. Cl.
*F16B 43/00* (2006.01)
(52) U.S. Cl. ..................................................... 411/533
(58) Field of Classification Search ............... 411/533, 411/183, 999
See application file for complete search history.

(56) References Cited

U.S. PATENT DOCUMENTS 2,324,175 A * 7/1943 Simms ....................... 411/427

(Continued)

FOREIGN PATENT DOCUMENTS

CA 2236720 A1 11/1999

(Continued)

*Primary Examiner*—Flemming Saether
(74) *Attorney, Agent, or Firm*—Kriegsman & Kriegsman

(57) ABSTRACT

The present invention relates to a nut (1) having a nut body (10) with a widened collar (15) and a rotary disc (20) which is fitted in a rotatable and captive manner on the nut body, the rotary disc being pushed onto the nut body (10) and retained in a captive manner by an arresting means. According to the invention, it is provided that the arresting means is designed as at least two segment-like beads (26; 26') provided on the nut body (10), such that the rotary disc (20) is fitted between the widened collar (15) and the segment-like beads (26; 26'). The invention also relates to a method of producing such a nut, in the case of which the nut body (10) and the rotary disc (20) are produced by massive forming and, before or after the rotary disc (20) has been pushed on, the segment-like beads (26, 26') are pressed into the nut body (10) by upsetting, or that, during production of the nut body (10), the segment-like beads (26; 26') are integrally formed in the nut body, with the result that the rotary disc (20) is positioned between the widened collar (15) and the segment-like beads (26; 26').

14 Claims, 4 Drawing Sheets

U.S. PATENT DOCUMENTS

| | | | |
|---|---|---|---|
| 2,985,213 A * | 5/1961 | Consandine | 411/183 |
| 3,389,736 A * | 6/1968 | Gulistan | 411/361 |
| 3,496,980 A * | 2/1970 | Kring et al. | 411/112 |
| 5,049,017 A * | 9/1991 | Reynolds | 411/432 |
| 5,112,176 A * | 5/1992 | McCauley et al. | 411/432 |
| 5,597,279 A | 1/1997 | Thomas et al. | |
| 5,662,444 A * | 9/1997 | Schmidt, Jr. | 411/369 |
| 5,842,894 A * | 12/1998 | Mehlberg | 439/801 |
| 5,934,851 A * | 8/1999 | Stewart et al. | 411/183 |
| 6,070,946 A * | 6/2000 | Holmes | 301/36.1 |
| 6,357,981 B1 * | 3/2002 | Lanham et al. | 411/431 |
| 6,843,631 B2 * | 1/2005 | Winker | 411/533 |

FOREIGN PATENT DOCUMENTS

| | | |
|---|---|---|
| CA | 2361450 A1 | 5/2002 |
| DE | 3325255 A1 | 1/1985 |
| EP | 0004185 A1 | 9/1979 |
| FR | 2408751 | 6/1979 |

* cited by examiner

NUT AND METHOD FOR THE PRODUCTION THEREOF

The present invention relates to a nut according to the preamble of claim 1 and to a method of producing the same.

A nut of the generic type is known from DE 33 25 255 C2. This document discloses a metal or a metal-alloy wheel nut for utility vehicles, having a nut body and a rotary disc in the form of a pressure disc. The rotary disc is pushed onto the nut body and anchored such that, although it can easily be rotated on the nut body, it cannot be stripped off. This is ensured by arresting means which are provided on the outer circumference of the nut body and on the inner circumference of the rotary disc and engage one inside the other such that the rotary disc is connected in a non-releasable manner to the nut body. This arresting means essentially comprises grooves or recesses which are incorporated in the nut body and the rotary disc.

The nut body and the rotary disc are produced in a manner known per se by massive forming, such as cold and/or hot pressing. The arresting means, however, have to be introduced into the nut body and the rotary disc by metal-cutting machining, for example by turning on a lathe, in a further operation, following pressing. This type of production, however, is complex and costly.

The object of the present invention is thus to provide a nut of the type mentioned above, and a method of producing the same, which is easier and more cost-effective to produce.

The object is achieved by a nut having a nut body with a widened collar and a rotary disc which is fitted in a captive manner by an arresting means, namely at least two segment-like beads provided on the nut body, such that the rotary disc is arranged between the widened collar and the segment-like beads. This does away with at least one turning operation, namely the subsequent machining of the rotary disc. The production method according to the invention provides for the segment-like beads to be pressed into the nut body. The method according to the invention thus merely comprises pressing operations. There is no metal-cutting machining involved. Since the pressing involves considerably less outlay than metal-cutting machining, the method according to the invention constitutes a particularly straightforward, quick and cost-effective way of producing such nuts, which is thus particularly suitable for mass production.

The rotary disc can be pushed onto the nut body before or after the segment-like beads have been produced. In the latter case, the rotary disc is pushed or pressed over the segment-like beads with some force being applied, usually mechanically. This may be advantageous when the surfaces of the nut body and/or of the rotary disc are provided with a coating serving, for example, as corrosion protection. If the rotary disc is pushed onto the nut body before the segment-like beads are provided, the nut body and the rotary disc have to be provided with the same surface coating. If, in contrast, the nut body and the rotary disc are to have different surface coatings, the coating has to take place before the rotary disc has been pushed onto the nut body. It is then necessary, however, for the segment-like beads to be pressed into the nut body prior to coating, since otherwise the surface coating would be damaged and, for example, the corrosion protection would no longer be ensured.

Advantageous developments can be gathered from the subclaims. The arresting means may comprise two segment-like beads arranged diametrically opposite one another on the nut body. It is also possible, however, to provide three or more segment-like beads which are distributed preferably uniformly around the circumference of the nut body.

A further advantageous embodiment may consist in that the length of the segment-like beads and the spacing between adjacent segment-like beads in the circumferential direction are of equal dimensions. It is also conceivable, however, for the spacings between the segment-like beads to be dimensioned to be smaller or greater than the length of the segment-like beads. This makes it possible for the necessary forces for pushing the rotary disc onto the nut body to be controlled to very good effect.

A further outstanding variant in the design of the segment-like beads may be provided by virtue of the beads being designed just as protuberances As a result, the energy necessary for pushing the rotary disc on would be further reduced and the working process would be significantly facilitated and rendered more efficient.

In a further preferred development, the nut body has a basic body and a neck extension. The neck extension may be provided with a conical surface, which terminates the neck extension, but this is not imperative. Embodiments without a conical surface are also possible. The segment-like beads are preferably formed on the neck extension. It is possible for an indent to be pressed into the conical surface and/or the neck extension, this indent being bounded, on its edge which is directed toward the rotary disc, by the segment-like beads. There are also other possible ways of pressing the segment-like beads, for example in the, during the pressing operation of the nut body, the neck extension is provided on its outside with a material overhang, for example with a slightly conical contour, which is then pressed to form the segment-like beads.

The rotary disc, preferably along its inner surface, has a cylindrical surface region which butts against the neck extension of the nut body. It is also possible, however, for the rotary disc to have a slightly conical surface region along its inner surface. Furthermore, at that end of the cylindrical or slightly conical surface region which is later directed toward the basic body, it may have a slope or chamfer. This is advantageous, in particular, when the rotary disc is pushed onto the neck extension of the nut body once the segment-like beads have been pressed. The slightly conical configuration or the slope or chamfer here facilitate the operation of pushing the rotary disc on.

A further preferred development consists in that the widened collar, on its side which is directed toward the neck extension, has a conical underside and the rotary disc, along its inner surface, has a conical surface region which is in contact with the conical underside of the widened collar. The conical underside and the conical surface region thus constitute mating frictional surfaces against which the rotary disc can be rotated. The rotary disc may be approximately trapezoidal in cross section. It is further possible for the basic body to have a cap.

The nut according to the invention is suitable, for example, for use as a wheel nut for motor vehicles.

An exemplary embodiment of the present invention is explained in more detail hereinbelow with reference to the attached drawings, in which.

Figure 1:
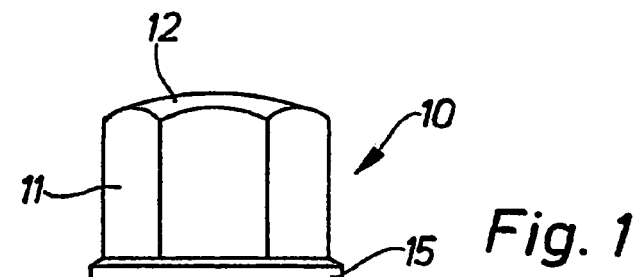
FIG. 1 shows a schematic side view, not to scale, of a nut body for a nut according to the invention.

The exemplary embodiments of a securing nut 1 according to the invention which can be seen from FIGS. 1 to 3a, 3b, 3c and 3d serve as a wheel nut for motor vehicles and comprise a nut body 10 and a rotary disc 20. The nut body 10 has a basic body 11 which, in the exemplary embodiment, is provided with a cap 12 on the side which is directed away from the wheel. The nut body 10 also has a bore 13 with an internal thread 14. It is, of course, also possible to omit the cap 12, with the result that the nut body 10 has a through-bore 13. In the exemplary embodiment, the basic body 11 is configured as a hexagonal body for a corresponding wheel wrench, but the configuration of the basic body 11 in this respect may, of course, be selected as desired.

On that side of the basic body 11 which is directed toward the wheel, the nut body 10 has a widened collar 15 with a conical underside 16, which serves as a contact surface for the inner surface of the rotary disc 20 (see below). This conical underside 16 is followed by a neck extension 17. The neck extension 17 is terminated by a conical surface 18.

The rotary disc 20 is of approximately trapezoidal design in cross section and has a conical outer surface 21. The inner surface 22 of the rotary disc 20 comprises a cylindrical surface region 23, which is in contact with the neck extension 17 of the nut body 10, and a conical surface region 24, which is in contact with the conical underside 16 of the widened collar 15 of the nut body 10. The conical surface region 24, on its outer edge, is bounded by a narrow collar 25.

Figure 2:
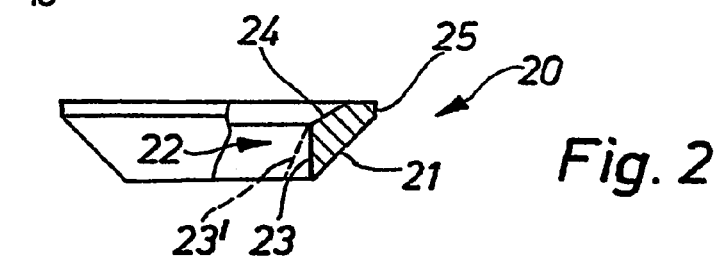
FIG. 2 shows a schematic, partly sectional side view, not to scale, of a rotary disc for the nut body shown in FIG. 1.
Figure 3A:
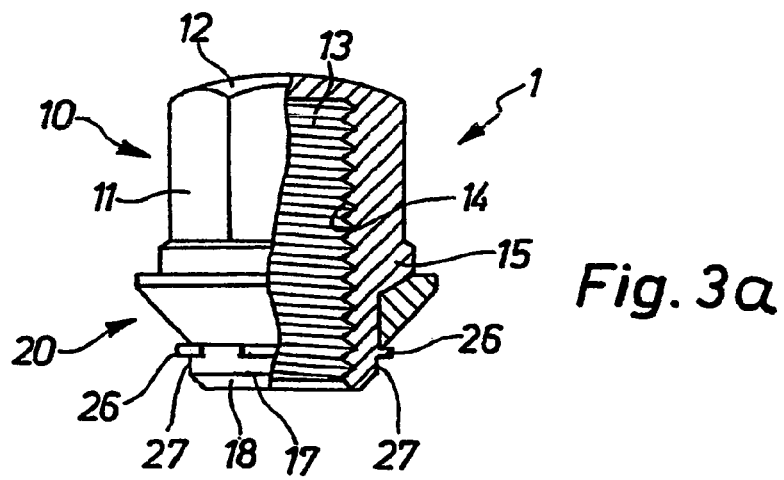
FIG. 3a shows a schematic, partly sectional side view, not to scale, of a nut according to the invention.

The dashed line in FIG. 2 indicates that a slightly conical surface region 23' may be provided instead of the cylindrical surface region 23. The illustration does not show that a small slope or chamfer may be provided at the top end of the cylindrical surface region 23 or of the slightly conical surface region 23', in the exemplary embodiment, that is to say, at the transition from the cylindrical 23 or slightly conical 23' surface region to the conical surface region 24. These configurations make it easier for the rotary disc 20 to be pushed onto the neck extension 17 once segment-like beads 26 have been provided (see below in this respect). The rotary disc 20 and the nut body 10 are both produced in a manner known per se by massive forming, such as cold and/or hot pressing. Both the outer surface of the neck extension 17 and the cylindrical surface region 23 or the slightly conical surface region 23' of the rotary disc 20 are completely smooth following the pressing operation. For assembly of the nut 10, the rotary disc 20 is pushed onto the neck extension 17 of the nut body 10 until the conical surface region 24 of the rotary disc 20 butts against the conical surface 18. Without additional securing means, however, the rotary disc 20 could again be stripped off from the neck extension 17 again. Segment-like beads 26 are provided according to the invention, as such securing means, between the rotary disc 20 and conical surface 18, and that side of the rotary disc 20 which is directed toward the wheel is seated thereon, with the result that the rotary disc cannot be stripped off from the neck extension 17.

The rotary disc 20 can be pushed onto the neck extension 17 before or after the segment-like beads 26 have been provided. In the latter case, the rotary disc 20 is pushed or pressed over the segment-like beads 26 with some force being applied, usually mechanically. It is advantageous here for the rotary disc to be configured with a slightly conical surface region 23' and/or for a slope or phase to be provided at the top end of this surface region, because the rotary disc 20 is thus easier to push on. If a slightly conical surface region 23' is provided, then the internal diameter at the top thereof, that is to say at the end which is directed toward the basic body 11, is equal to or somewhat larger than the diameter of the segment-like beads 26. The internal diameter of the bottom, that is to say at the end which is directed toward the segment-like beads 26, is smaller than the diameter of the segment-like beads 26.

Figure 3B:
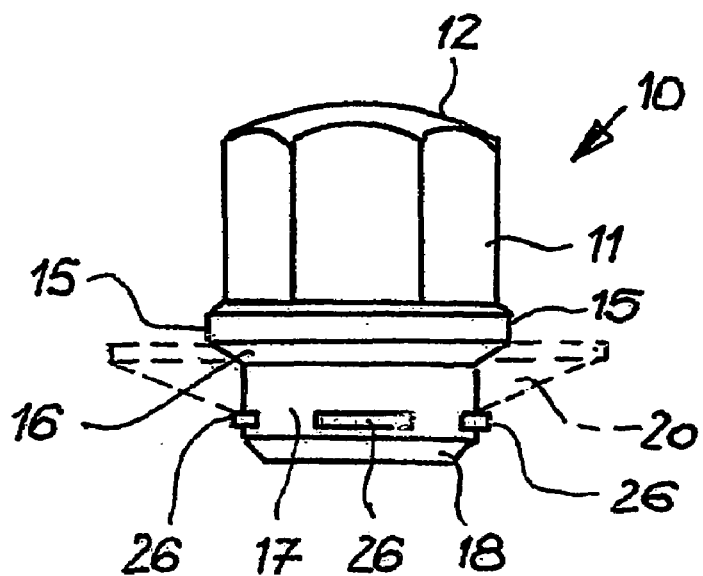
FIG. 3b shows a schematic illustration, not to scale, of the nut according to FIG. 3a in elevation.

The segment-like beads 26 formed on the neck extension 17 of the nut body 11 can clearly be seen in FIG. 3b. Four segment-like beads 26 distributed uniformly around the circumference of the neck extension 17 are illustrated in the exemplary embodiment of FIG. 3b. It is also possible, however, to provide just two or three or more than four segment-like beads 26. In order to give a clear illustration of the segment-like beads 26, the rotary disc 20 has only been indicated by dashed lines.

Figure 3C:
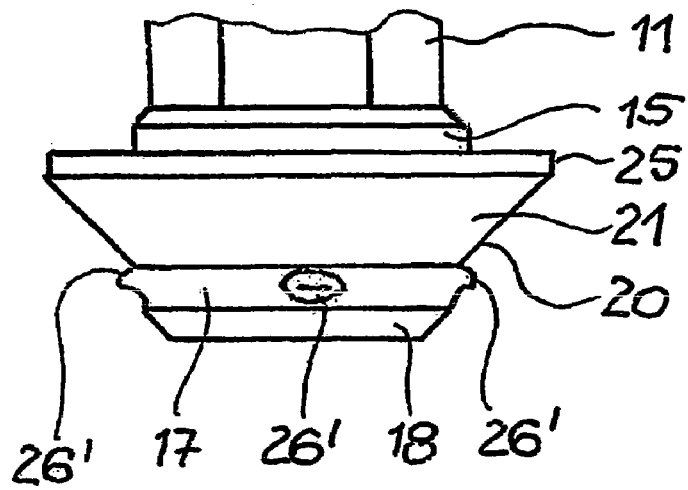
FIG. 3c shows a further exemplary embodiment of a nut according to the invention in a schematic illustration, not to scale, in elevation.
Figure 3D:
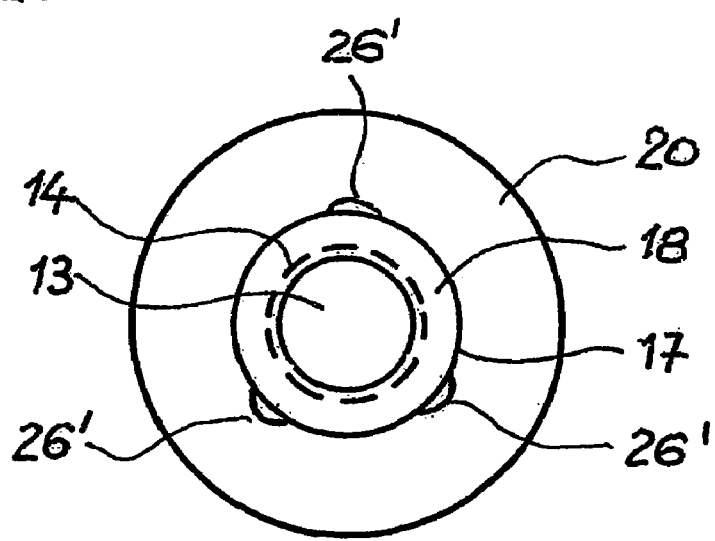
FIG. 3d shows the nut according to FIG. 3c in a schematic illustration, not to scale, as seen in arrow direction A in FIG. 3c.

FIGS. 3c and 3d illustrate an advantageous variant of the segment-like beads 26 in the form of small protuberances 26' which can be introduced into the neck extension 17 or into the region of the cone 18 by a straightforward upsetting operation or pressing operation, using a suitable tool (see below).

Figure 3E:
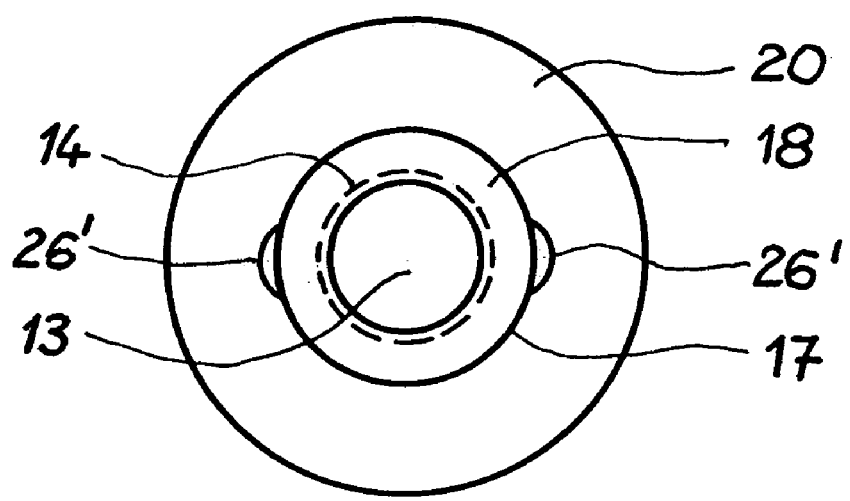
FIG. 3e shows still a further exemplary embodiment of a nut according to the invention in a schematic illustration, not to scale.

FIG. 3e illustrates another variant in which there are only two segment-like beads 26, beads 26 being diametrically opposed to one another.

For producing arresting means of such a design for the rotary disc 20, for example the protuberances 26', an energy-saving and thus cost-effective working process is possible because only a very small amount of material has to be moved and thus only slight deformation of the nut is necessary.

Figure 4:
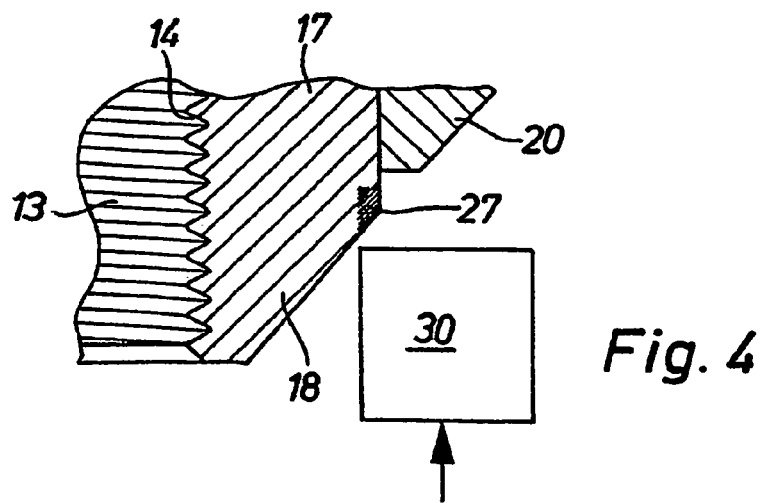
FIGS. 4 and 5 show a schematic illustration of the method steps for producing the nut shown in FIG. 3 in accordance with a first embodiment of a method according to the invention.
Figure 5:
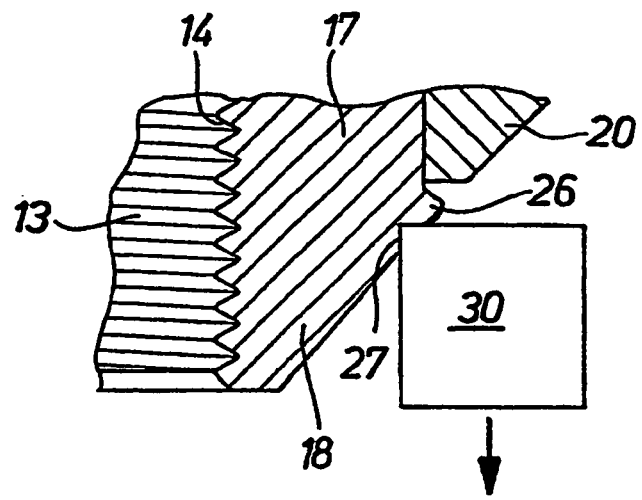

The segment-like beads 26 may be formed directly in the nut body 10 during pressing of the latter. It is also possible, however, for them to be produced by the conical surface 18 and/or the neck extension 17 being upset, as is illustrated schematically in FIGS. 4 and 5. By means of a tool 30, for example a die, in the exemplary embodiment approximately rectangular indents 27 are pressed into the conical surface 18 and/or the neck extension 17. The excess material pressed out of the indents 27 by the pressing operation forms upset portions, or the segment-like beads 26 or 26', above the indents 27. These thus bound the indents 27 on their edges which are directed toward the rotary disc 20.

Figure 6:
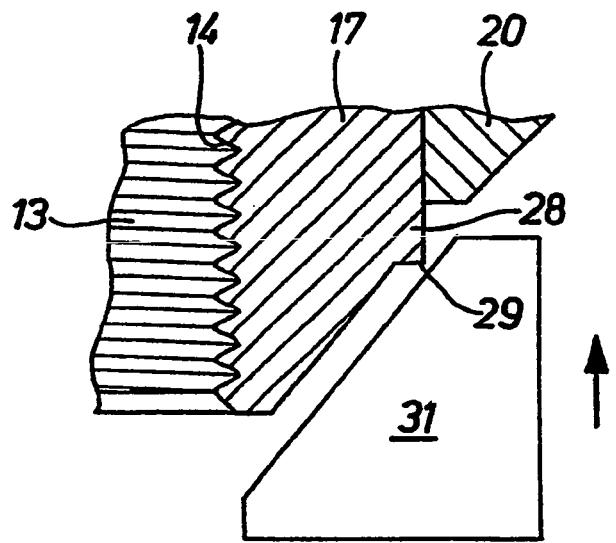
FIGS. 6 and 7 show a schematic illustration of the method steps for producing the nut shown in FIG. 3 in accordance with a second embodiment of the method according to the invention.
Figure 7:
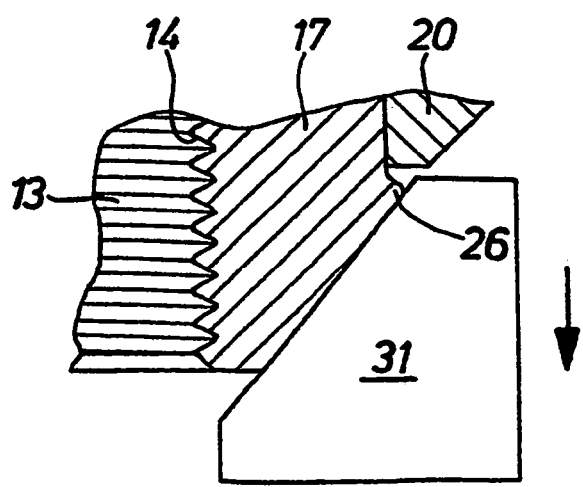

A further possible way of pressing the segment-like beads 26 or 26' into the neck extension 17 is illustrated schematically in FIGS. 6 and 7. In this case, a material overhang 28 is also formed during pressing of the nut body 10, this material overhang having a slightly conical outer contour or being provided with a small phase 29 or slope at its end which is directed toward the basic body 11. The material overhang 28 is preferably formed at the transition from the conical surface 18 to the neck extension 17. This material overhang 28 is pressed upward in the direction of the basic body 11 using a suitable tool 31, with the result that the segment-like beads 26 or protuberances 26' are formed—in the exemplary embodiment on the neck extension 17.

The method according to the invention which is used for producing the abovedescribed nut 1 thus merely comprises pressing operations and is therefore straightforward, cost-effective and suitable for the mass production of such nuts, in particular for motor-vehicle wheel nuts produced in large numbers.

The invention claimed is:

1. A nut comprising a nut body and a rotary disc, the nut body having basic body with structure for receiving a tool, a neck extension and a widened collar, the widened collar being disposed between the basic body and the neck extension, the rotary disc being fitted in a captive manner on the neck extension, the rotary disc being pushed onto the nut body and retained in a captive manner by an arresting means, wherein the nut body and the rotary disc are produced as hot or cold pressed components/parts and wherein the arresting means is designed as at least two circumferentially spaced beads provided on the nut body and spaced axially under the widened collar, such that the rotary disc is arranged between the widened collar and the beads and such that the entire rotary disc is located axially above the beads in the direction of the collar.

2. The nut as claimed in claim 1, characterized in that two beads are arranged diametrically opposite one another on the nut body.

3. The nut as claimed in claim 1, characterized in that three or more beads are distributed uniformly around the circumference of the nut body.

4. The nut as claimed in claim 1, characterized in that the length of the beads and the spacing between adjacent beads in the circumferential direction are of equal dimensions.

5. The nut as claimed in claim 1, characterized in that the spacing between the beads are dimensioned to be smaller or greater than the length of the beads.

6. The nut as claimed in claim 1, characterized in that the beads are designed as protuberances.

7. The nut as claimed in claim 1, characterized in that a conical surface terminates the neck extension.

8. The nut as claimed in claim 7, characterized in that the beads are formed at the transition from the conical surface to the neck extension.

9. The nut as claimed in claim 7, characterized in that an indent is pressed into the conical surface and/or the neck extension, this indent being bounded, on its edge which is directed towards the rotary disc, by the beads.

10. The nut as claimed in claim 1, characterized in that the widened collar, on its side which is directed toward the neck extension, has a conical underside and the rotary disc, along its inner surface, has a conical surface region, which is in contact with the conical underside of the widened collar.

11. The nut as claimed in claim 1, characterized in that the rotary disc, along its inner surface, has a cylindrical or slightly conical surface region which butts against the neck extension.

12. The nut as claimed in claim 1, characterized in that the rotary disc is approximately trapezoidal in cross section.

13. The nut as claimed in claim 1, characterized in that the basic body has a cap.

14. The nut as claimed in claim 1, namely a wheel nut for motor vehicles.

* * * * *